United States Patent [19]

Eriksson et al.

[11] Patent Number: 5,108,617

[45] Date of Patent: Apr. 28, 1992

[54] METHOD OF USING ZEOLITES FOR ADSORBING DETERGENTS

[76] Inventors: Håkan Eriksson, Ernst Wigforss gata 48, S-222 62; Zoltan Blum, Bantorget 6, S-222 29, both of Lund, Sweden

[21] Appl. No.: 693,722

[22] Filed: Apr. 30, 1991

[51] Int. Cl.$^5$ .............................................. B01D 15/00
[52] U.S. Cl. ..................................... 210/679; 210/691
[58] Field of Search ................................ 210/679, 691

[56] References Cited

U.S. PATENT DOCUMENTS 3,699,039 10/1972 Calmon et al. ...................... 210/691
4,421,567 12/1983 Kulprathipanja et al. .......... 210/679

Primary Examiner—Ivars Cintins
Attorney, Agent, or Firm—Kane, Dalsimer, Sullivan, Kurucz, Levy, Eisele & Richard

[57] ABSTRACT

The present invention refers to a method of using zeolites for adsorbing detergents. More specifically, it refers to the use of hydrophobic zeolites for adsorbing anionic, cationic and nonionic detergents in solutions containing such detergents.

6 Claims, 1 Drawing Sheet

METHOD OF USING ZEOLITES FOR ADSORBING DETERGENTS

BACKGROUND OF THE INVENTION

The present invention refers to a method of using zeolites for adsorbing detergents. More specifically, it refers to the use of hydrophobic zeolites for adsorbing anionic, cationic and nonionic detergents in solutions containing such detergents.

Detergents, amphiphilic molecules containing a hydrophobic and a hydrophilic part, are commonly used chemicals within various techniques. The hydrophilic part of a particular detergent molecule can be either charged or uncharged and the detergents are thus characterized as anionic, cationic, or nonionic. In e.g. biochemistry, detergents are used mainly to stabilize emulsions, and solubilizing lipids, cell membranes, and protein aggregates.

Purification of membrane components and intracellular molecules is often carried out in the presence of detergents. However, of the common purification methods, ion exchange chromatography is interfered with by ionic detergents and an increased apparent molecular weight is obtained upon gel filtration in the presence of large micelles formed with nonionic detergents.

The development of cDNA technology and the increased production of recombinant proteins which are generated in the form of intracellular protein aggregates; "inclusion bodies", has increased the demand for both fast and large scale purification methods. To be able to freely chose among purification methods the detergent has to be removed after fulfilling its purpose, solubilization of proteins. Today this is achieved by dialysis, ion exchange chromatography, or absorption to hydrophobic matrixes. Dialysis is time consuming, especially if the detergent forms large micelles and has a low critical micelle concentration (CMC). Ion exchange chromatography of anionic and cationic detergents is thwarted by the net charge of the proteins. Adsorption of detergents to hydrophobic matrixes such as BioBeads SM-2 or Amberlite XAD-2 is effective. However, adsorption to the latter matrixes is not attainable with all kinds of detergents and large scale application of the method is expensive.

Thus there is a great demand for a fast and large scale purification method by means of which it is possible to efficiently remove all types of detergents.

SUMMARY OF THE INVENTION

An object of the invention is to provide a method for adsorbing detergents in various systems and processes using hydrophobic zeolites, which method is fast and highly efficient.

Another object of the present invention is to provide a method for adsorbing detergents in various systems and processes using hydrophobic zeolites, where the zeolites show high stability and may easily and effectively be regenerated.

A further object of the present invention is to provide a method for adsorbing detergents in various systems and processes using hydrophobic zeolites, by which it is possible to adsorb all types of detergents (anionic, cationic and nonionic) in a highly efficient way.

A still further object of the present invention is to provide a method for adsorbing detergents in large scale systems and processes.

The objects of the present invention are fulfilled by providing a method for adsorbing detergents comprising applying a hydrophobic zeolite to a solution including one or more of anionic, cationic or nonionic detergents in an amount sufficiently effective to remove substantially all of the detergent.

The present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention and wherein.

DETAILED DESCRIPTION OF PREFERRED EMBODIMENTS

Figure 1:
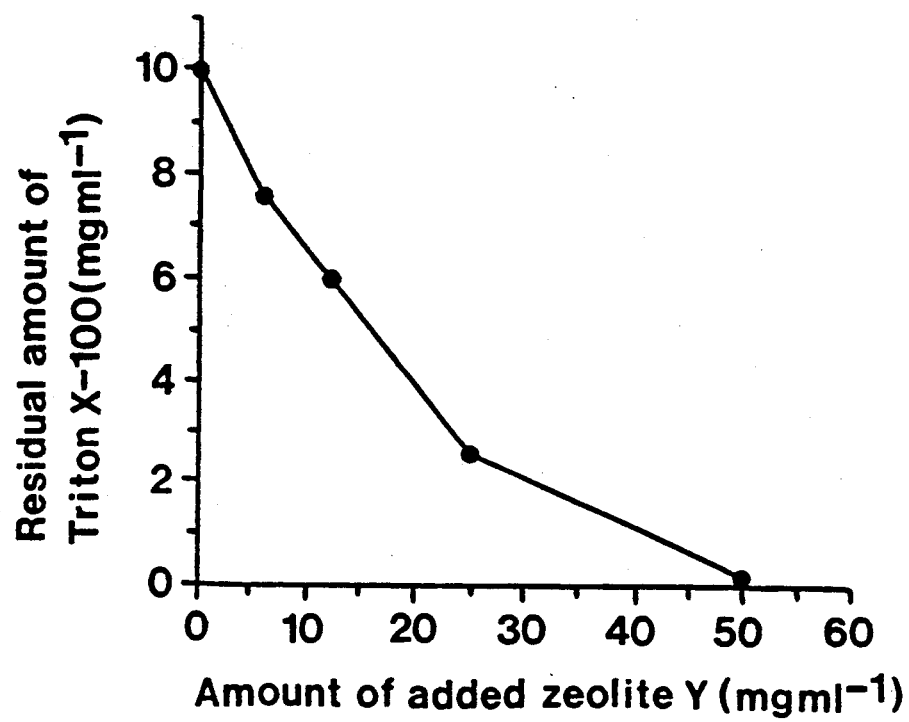
FIG. 1 refers to the test according to Example 1 and
FIG. 2 refers to the test according to Example 2.

The present invention refers to a method for adsorbing detergents in various systems and processes using hydrophobic zeolites.

Zeolites, framework aluminium silicates or tectosilicates, are characterized by their chemical composition and crystal structure. The chemical composition is generally expressed in terms of the Si/Al ratio. High silica zeolites carry less framework charge and are commonly referred to as hydrophobic; the opposite holds true for high alumina zeolites which are labelled hydrophilic. Zeolites may also contain other ions than Si and Al.

The hydrophobic zeolites used in the method according to the present invention may be characterized as zeolitic framework structures of the type $[(AlO_2)_x(SiO_2)_y]$. To this zeolitic framework is bound a cation for each Al atom, for example Na. Other ions like P, B, Ge may be substituted for Al and Si to form zeolitic frameworks and may thus be used in the method according to the present invention. All zeolites contain more or less water molecules. Hydrophobic zeolites are generally prepared by modifying synthetically derived hydrophilic zeolites, where more or less of the Al molecules have been removed in order to make the zeolite hydrophobic.

The definition of hydrophobic and hydrophilic zeolites, respectively, is under discussion, but generally with regard to the above type of zeolitic structures, $[(AlO_2)_x(SiO_2)_y]$ where x and y are integers, the ratio of y to x should exceed around 50 to make a hydrophobic zeolite.

The zeolite used in the examples given below are characterized by having a ratio of y to x of more than 1000.

Pore sizes of the zeolites vary typically in the range of 3–10 Å and the accessibility of the porous system is dimensionality dependent. Zeolites which may be used according to the present invention are e.g. silicalite and hydrophobic varieties of zeolite Y and mordenite and they can be obtained essentially free from aluminium either through direct synthesis (silicalite) or by means of post-synthetic manipulations (mordenite, zeolite Y). Zeolite Y and mordenite have pore sizes in the upper range, about 7.5 Å and 7.0 Å respectively, while silicalite is a middle range zeolite with about 5.5 Å pore size. The porous systems in zeolite Y and silicalite are readily accessible due to the three dimensional arrangement of the channels; mordenite is somewhat less operative as the porous system is one dimensional.

High-silica zeolites have strong hydrophobic characteristics and are stable in aqueous systems within a wide pH range, and are unsensitive to oxidation and reduction agents. Furthermore, they withstand high pressures and high temperatures without being altered. Any risk of chemical contamination as well as biologic infection may be eliminated by adequate pretreatment. The zeolites may be easily regenerated.

The chemistry of zeolites is well known within the art and will not be described herein in further detail.

The hydrophobic zeolites used in the method according to the present invention may be used to adsorb all types of detergents, anionic, cationic and nonionic, and moreover in a highly efficient way.

The adsorption of detergents by means of the hydrophobic zeolites according to the present invention is extremely fast and efficient. With an optimal ratio of zeolite to detergent the time for removal of the detergent is a matter of seconds rather than minutes. The zeolites used according to the present invention are extremely efficient and, as will appear from the examples here below, the residual amount of detergent at the proper detergent to zeolite ratio is non detectable. The actual amount is most likely even lower, since the values obtained touch the accuracy of analysis. Zeolites adsorb detergent molecules on the basis of the pore size of the actual zeolite structure. This adjustment to have an optimal efficiency lies within the scope of the skilled man within the art.

According to a specifically preferred embodiment of the present invention the hydrophobic zeolite used for adsorbing detergents is a hydrophobic zeolite having the framework structure $[(AlO_2)_x(SiO_2)_y]$ wherein $x$ and $y$ are integers and $y/x > 1000$. An example of such a zeolite is Zeolite Y from Tosoh Co, Japan.

The amount of hydrophobic zeolites used in relation to amount detergent is highly dependent on the type of zeolite and the type of detergent. To find the optimal ratio lies within the scope of the skilled man within the art. In the examples given below the ratio of detergent to zeolite is 1 to 5 in order to have a substantially complete removal of the detergent.

The hydrophobic zeolites used in the method according to the present invention may be used in various systems and processes to adsorb various types of detergents, as mentioned both nonionic, cationic and anionic. The hydrophobic zeolites in the method according to the present invention may be used in biochemical/biotechnical systems or in processes for removing detergents in order to facilitate the purification of biomolecules, such as synthetic or naturally occuring biologically active molecules, where the detergent has been added in order to allow solubilisation of said molecule.

The hydrophobic zeolites used in the method according to the invention may be used in combination with one or more permeable, non-zeolitic material. They may for example be entrapped in a polymer such as agarose.

Preferably when the zeolite crystals are small aggregate of crystals may be entrapped in agarose beads to enhance flow characteristics. Other appropriate agarose may be used as well.

Below are given some further examples of the applicability of the method according to the present invention. However it is obvious that this method may be used in all systems and processes where a detergent has to be removed.

In addition to the above mentioned properties, use is made, in biochemical/biotechnical contexts, of the ability of detergents to interfere with and dissolve biological membranes. Membrane-constructing molecules are amphiphilic, and the aggregates constructed by them are easily attacked by the more pronouncedly amphiphilic detergent molecules, whereby the membrane is dissolved. This results in turn in proteins and other components becoming accessible for purification and isolation. Usually, it is however necessary first to remove the detergent, since it would otherwise render a successful purification difficult or impossible. Many biochemical/biotechnical processes include the use of various detergents. These can be regarded as so-called supplementary chemicals, i.e. they are added in a specific stage, perform the intended task, whereupon they are removed from the system. In most cases it is of utmost importance that the detergent can be removed effectively and besides in a relatively quick manner. When using so-called recombinant DNA technology where a genetically manipulated organism is made to produce a protein, it is most important that the purification procedure takes place without unnecessary delay. Since all membranes of the intact organism are dissolved as the detergent is added, so-called proteolytic enzymes are also released, which quickly decompose all proteins present.

The method according to the present invention may be used within the polymer industry, polymerisation often requiring the addition of detergents. Within waste water treatment plants various types of detergents have to be removed from the waste water originating from different types of laundries; dry cleaning and car washing establishments etc.

Generally speaking detergents severely contribute to the environmental pollution. The industry of painting, lacquering and varnishing is another area using a great deal of detergents.

EXAMPLES

Example 1: Adsorption of a Nonionic Detergent to Zeolite Y

Zeolite Y (Si:Al>1000 from Tosoh Co, Japan) was added to Triton ® X-100, 10 mg ml$^{-1}$ and $^3$H labelled Triton ® X-100 (1.4×10$^6$ dpm ml$^{-1}$, NEN-556, NEN Research Products, Boston, U.S.A.) solubilized in phosphate buffered saline (PBS) containing 10 mg ml$^{-1}$ bovine serum albumin (BSA). The suspensions were vortex mixed for 60 s and centrifuged for 10 min at 12000 xg before the detergent remaining in the supernatants were assayed by counting in a $\beta$-scintillator. FIG. 1 shows the residual amount of detergent in the supernatants versus the amount added zeolite. At a detergent to zeolite ratio of 1 to 5 no residual detergent is detectable.

Example 2: Adsorption of a Cationic Detergent to Zeolite Y

Figure 2:
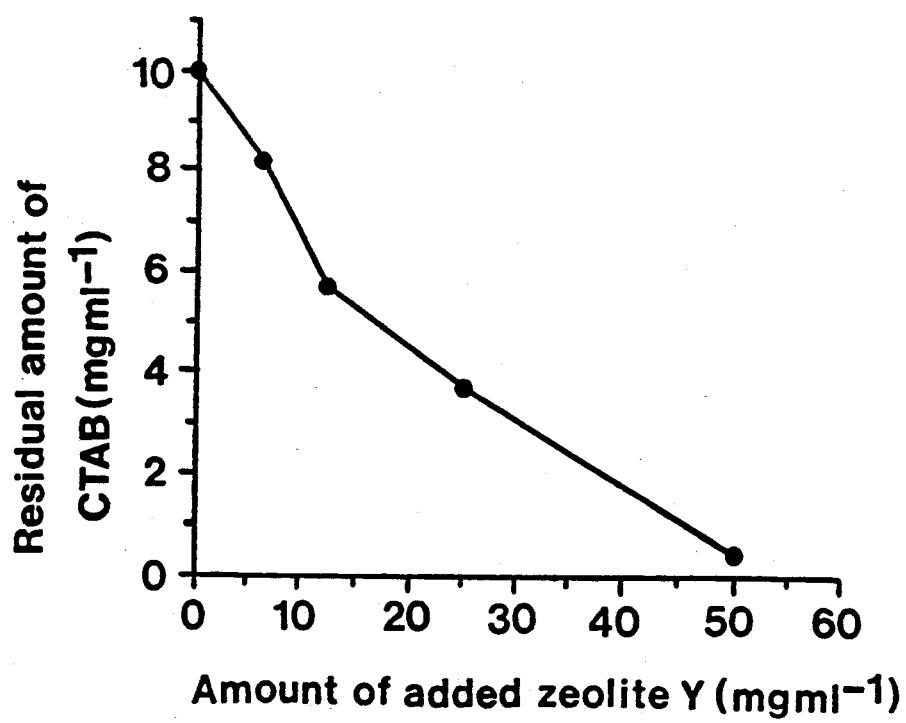

Zeolite Y (Si:Al>1000 from Tosoh Co, Japan) was added to cetyl trimethyl ammonium bromide (CTAB), 10 mg ml$^{-1}$ and $^3$H labelled octadecyl trimethyl ammonium bromide ($5.6 \times 10^6$ dpm ml$^{-1}$, a kind gift from Prof. Barry Ninham, Applied Mathematics, Australian National University, Canberra, Australia) solubilized in phosphate buffered saline (PBS) containing 10 mg ml$^{-1}$ bovine serum albumin (BSA). The suspensions were vortex mixed for 60 s and centrifuged for 10 min at 12000 xg before the detergent remaining in the supernatants were assayed by counting in a $\beta$-scintillator. FIG. 2 shows the residual amount of detergent in the supernatant versus the amount added zeolite. At a detergent to zeolite ratio of 1 to 5 no residual detergent is detectable.

Example 3: Adsorption of Anionic, Cationic and Nonionic Detergent to Zeolite Y

| Detergent | Initial conc. (mM) | Lowest conc. giving lysis (mM) | Critical micelle conc. (mM) | Amount of Zeolite Y required to completely inhibit lysis (mg ml$^{-1}$) |
|---|---|---|---|---|
| Anionic | | | | |
| εDε | 34,7 | 0.40 | 27 | 100 |
| Sarkosyl | 35,8 | 2,2 | not found | 50 |
| Cationic | | | | |
| CTAB | 27,4 | 0,043 | 0,026 | 100 |
| Nonionic | | | | |
| Triton X-100 | 16,0 | 0.4 | 0,24 | 50 |

Zeolite Y (Si:Al>1000 from Tosoh Co, Japan) was added to phosphate buffered saline (PBS) containing 10 mg ml$^{-1}$ detergent. The suspensions were vortex mixed for 60 s, centrifuged for 10 min at 12000 xg and the presence of detergents remaining in the supernatants were assayed by lysis of red blood cells.

Briefly blood cells from healthy donors were washed with PBS and suspended in PBS ($2 \times 10^8$ cells ml$^{-1}$). An equal volume of red blood cells and a dilution series of the detergent solutions, before and after treatment with zeolite Y, were mixed in agglutination plates. After one hour at 37° C., total lysis of the red blood cells was investigated.

Example 4: Adsorption of Nonionic Detergent to Zeolite Y Entrapped in Agarose Beads Entrapment of Zeolite Y in agarose beads:

Zeolite Y, 2 g (Si:Al>1000 from Tosoh Co, Japan), 800 mg agarose (type I, Sigma Chemicals, St. Louis, U.S.A.) and phosphate buffered saline (PBS) to a final volume 20 ml were heated to 95° C. and poured into 200 ml toluene containing 2% (v/w) of the emulsifier Arlacel (Kemi-Intressen, Sundbyberg, Sweden) stirred at a speed of 900 rev/min. The produced beads were washed with acetone and PBS.

Adsorption of Triton X-100 to zeolite Y entrapped in agarose beads:

1 g of wet spheres was added to 1 ml of Triton X-100, 10 mg ml$^{-1}$ in PBS and incubated for 30 min on a rocking table. After sedimentation of the beads, the absorbance at 276 nm showed that less than 1% of the Triton X-100 remained in the supernatant.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for adsorbing detergents comprising bringing a solution including one or more of anionic, cationic or nonionic detergents into contact with a hydrophobic zeolite having a zeolitic framework structure $\{(AlO_2)_x (SiO_2)_y\}$, wherein x and y are integers and $y/x > 50$, in an amount sufficiently effective to remove substantially all of the detergent.

2. A method according to claim 1 wherein said solution is a biochemical or biotechnical process or reaction solution.

3. A method according to claim 1 wherein said solution is a solution of biomolecules.

4. A method according to claim 1 wherein said hydrophobic zeolite is combined with one or more permeable, non-zeolitic material.

5. A method according to claim 4 wherein said hydrophobic zeolite is entrapped in a polymer.

6. A method according to claim 1 wherein said hydrophobic zeolite has the zeolitic framework structure $\{(AlO_2)_x (SiO_2)_y\}$, wherein x and y are integers and $y/x > 1000$.

* * * * *